US010667649B2

(12) United States Patent
Rosenbaum (10) Patent No.: US 10,667,649 B2
(45) Date of Patent: *Jun. 2, 2020

(54) DISPOSABLE, RECYCLABLE BARBECUE GRILL

(71) Applicant: Amir Rosenbaum, Los Altos Hills, CA (US)

(72) Inventor: Amir Rosenbaum, Los Altos Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/293,116

(22) Filed: Oct. 13, 2016

(65) Prior Publication Data

US 2018/0103798 A1  Apr. 19, 2018

(51) Int. Cl.
*A47J 37/07* (2006.01)

(52) U.S. Cl.
CPC ....... *A47J 37/0763* (2013.01); *A47J 37/0768* (2013.01)

(58) Field of Classification Search
None
See application file for complete search history.

(56) References Cited

U.S. PATENT DOCUMENTS

| 661,707 A | 11/1900 | Sanford |
| 3,552,301 A * | 1/1971 | McNeff ................. A47J 37/067 |
| | | 126/25 R |
| 3,611,915 A * | 10/1971 | Glaser ................. A47J 37/0786 |
| | | 99/445 |
| 3,812,840 A * | 5/1974 | Whaler ................. A47J 37/0713 |
| | | 126/25 R |
| 3,989,028 A | 11/1976 | Berger |
| 4,281,633 A * | 8/1981 | Wackerman ........ A47J 37/0704 |
| | | 126/25 A |
| 4,373,315 A * | 2/1983 | Farrant ................. E04D 3/362 |
| | | 52/522 |
| 4,436,081 A | 3/1984 | Hefling |
| 4,463,746 A * | 8/1984 | Knuth ................. A47J 37/0763 |
| | | 126/25 R |

(Continued)

OTHER PUBLICATIONS

U.S. International Searching Authority, International Search Report and Written Opinion of the International Searching Authority, Int'l App. No. PCT/US 17/50190, dated Jan. 12, 2018.

*Primary Examiner* — Ibrahime A Abraham
*Assistant Examiner* — Gyounghyun Bae
(74) *Attorney, Agent, or Firm* — Munck Wilson Mandala; J. Chase Covello (57) ABSTRACT

A portable, lightweight, disposable kettle-type barbecue grill, a fuel disc for use with the grill, and methods for fabricating, packaging, assembling, and using such a grill and fuel disc, are presented. The grill's components are made of lightweight materials and are configured to be nested inside one another to maximize space efficiency and durability for shipping and storage, and configured for easy unpacking and assembly by the user. Adjustable air vents control the cooking heat and speed. The fuel disc is made from charcoal and optionally includes hardwood chips and lighter fluid. Apertures in the fuel disc work together with the shape of the air vents and the grill to promote even airflow and temperature throughout the grill, resulting in consistent cooking. The grill is inexpensive and is entirely or partly made of recyclable materials, so the user may choose to dispose of the grill after a single use.

10 Claims, 13 Drawing Sheets

(56) References Cited

U.S. PATENT DOCUMENTS

| | | | |
|---|---|---|---|
| 4,624,239 A | 11/1986 | Yellin | |
| 4,630,593 A * | 12/1986 | Gremillion | A47J 37/0786 126/25 R |
| RE33,091 E * | 10/1989 | Schlosser | A47J 37/0786 126/182 |
| 4,877,010 A | 10/1989 | Hait | |
| 4,881,520 A * | 11/1989 | Hefling | F24C 3/14 126/44 |
| 4,924,845 A | 5/1990 | Johnson et al. | |
| 5,036,832 A | 8/1991 | Schlosser et al. | |
| 5,167,183 A * | 12/1992 | Schlosser | A47J 37/0713 126/25 R |
| 5,359,988 A | 1/1994 | Hait | |
| 5,299,553 A * | 4/1994 | Giebel | A47J 37/0786 126/242 |
| 5,546,851 A * | 8/1996 | Goto | A47J 37/0676 99/446 |
| 5,572,983 A * | 11/1996 | Schlosser | A47J 37/0704 126/25 R |
| 5,582,094 A * | 12/1996 | Peterson | A47J 37/0786 126/25 R |
| 5,687,704 A | 11/1997 | Lerch et al. | |
| 5,755,151 A * | 5/1998 | Nowicke, Sr. | A47J 37/0704 126/25 R |
| 5,947,106 A | 9/1999 | Davis | |
| 5,970,858 A * | 10/1999 | Boehm | A47J 37/0629 99/400 |
| 6,000,319 A * | 12/1999 | Treiber | A23B 4/052 99/449 |
| 6,116,150 A * | 9/2000 | Greenfield, Jr. | A47J 37/08 219/492 |
| 6,198,076 B1 * | 3/2001 | Moen | F24C 15/322 126/21 A |
| 6,253,760 B1 * | 7/2001 | Mashburn | A47J 37/0704 126/25 R |
| 6,619,501 B2 * | 9/2003 | Hayes | B65D 1/34 220/605 |
| 6,639,199 B1 * | 10/2003 | Ross, Jr. | A47J 36/027 219/732 |
| 6,684,876 B2 * | 2/2004 | Bossler | A47J 37/0704 126/25 R |
| 7,823,746 B1 * | 11/2010 | McCumber | B65D 25/325 220/4.21 |
| D677,987 S | 3/2013 | High | |
| 8,399,810 B2 * | 3/2013 | Ahmed | A47J 37/0709 219/386 |
| 8,584,881 B2 * | 11/2013 | Hernandez | B65D 21/0223 206/521 |
| 8,651,018 B1 * | 2/2014 | Loud, III | A47J 37/0704 126/25 R |
| 8,895,091 B2 * | 11/2014 | Boyer | A47G 23/00 206/551 |
| 9,380,910 B1 | 7/2016 | Noel, II | |
| 9,427,107 B2 * | 8/2016 | Reinhart | A47J 37/0786 |
| 9,427,108 B2 * | 8/2016 | Ahmed | A47J 37/067 |
| 10,273,078 B2 * | 4/2019 | Zanchetta | B65D 25/2894 |
| 2013/0206850 A1 | 8/2013 | Erickson | |

\* cited by examiner

DISPOSABLE, RECYCLABLE BARBECUE GRILL

BACKGROUND OF THE INVENTION

(1) Field of the Invention

The present invention relates generally to barbecue grills, and more particularly to a portable, lightweight, disposable kettle-type barbecue grill, charcoal fuel disc for use with the grill, cooking utensils, and methods for fabricating, packaging, assembling, and using the same.

(2) Description of the Related Art

Kettle-type barbecue grills are a design of barbecue grill that are known for their excellent cooking quality and versatility. A kettle-type barbecue grill burns charcoal and may be used for both direct heat cooking (grilling) and indirect heat cooking (barbecuing). The hemispherical shape of the kettle distributes heat more evenly than other barbecue grill configurations. Furthermore, the kettle's lid allows smoke to be retained inside the grill during cooking, which enhances the flavor of the cooked food. Adjustable air vents in the bottom of the kettle and the top of the lid allow control of the cooking heat and speed, as well as the amount of smoke retained inside the grill. Prior art kettle-type grills include the barbecue grills made by Weber, including the portable "Smokey Joe" grill, among others. Prior art kettle-type grills are described in, for example, U.S. Pat. No. RE33,091 entitled "Ash Disposal Damper for Barbecue Kettle".

Other types of barbecue grills are known in the prior art that are portable, disposable, and/or recyclable. Examples include hibachi-type grills, commonly sold as "Tabletop Charcoal Grills", and single-use rectangular foil pan grills, such as the "EZ Grill Portable Disposable Instant Barbeque". These prior art grills typically include a flat-bottomed rectangular or circular pan where the charcoal burns, as well as a wire cooking grill and support legs to support the pan above the ground. However, these prior art portable grills do not include a lid, adjustable air vents, or a hemispherical cooking chamber, so they do not allow the level of control over cooking that a kettle-type grill allows.

Prior art kettle-type barbecue grills are constructed of relatively thick-walled steel and are therefore heavier and more expensive to transport than single-use rectangular foil pan grills or hibachi-type grills. Furthermore, the components of prior art kettle-type grills are not shaped to allow for nesting and compact packaging of the grill components for efficient shipping and storage. Thus, there is a need for a portable, disposable, recyclable barbecue grill that cooks food as well as a kettle-type grill, yet is lightweight, durable, and that is configured for compact packaging for shipping and storage.

BRIEF SUMMARY OF THE INVENTION

A portable, lightweight, disposable kettle-type barbecue grill, a fuel disc for use with the grill, and methods for packaging, fabricating, and using such a grille and fuel disc, are presented. In one or more embodiments, the apparatus of the present invention includes an ash catcher, support base, adjustable intake damper, intake damper adjustment lever, bottom bowl, charcoal tray, cooking grill, lid, lid handle, adjustable exhaust damper, fuel disc, matches, serving tongs, and serving bowl. In one or more embodiments, the ash catcher, support base, adjustable intake damper, bottom bowl, charcoal tray, cooking grill, lid, and adjustable exhaust damper are made of lightweight metal sheet or foil, such as aluminum sheet or foil. In one or more embodiments, the intake damper adjustment lever, lid handle, and serving tongs are made of lightweight wood or bamboo. In one or more embodiments, the serving bowl is made of polymer, such as polycarbonate.

In one or more embodiments, the method of the present invention includes forming an ash catcher, support base, adjustable intake damper, bottom bowl, charcoal tray, cooking grill, lid, and adjustable exhaust damper out of a lightweight metal sheet or foil, such as aluminum sheet or foil. In one or more embodiments, the method of the present invention includes forming an intake damper adjustment lever, lid handle, and serving tongs out of lightweight wood or bamboo. In one or more embodiments, the method of the present invention includes forming a fuel disc out of charcoal and optionally including hardwood chips to add smoke and flavor. In one or more embodiments, the method of the present invention includes forming a serving bowl out of polymer, such as polycarbonate. In one or more embodiments, the components of the present invention are configured to nest inside one another to maximize space efficiency, with the polycarbonate bowl configured to be used as a shipping and storage container to protect the other components of the invention. In one or more embodiments, the present invention includes a method of unpacking and assembly of the components into a kettle-type barbecue grill, serving bowl, and cooking utensils.

In one or more embodiments, the barbecue grill of the present invention includes an intake damper and intake air vent in the support base and an exhaust damper and upper air vent in the top of the lid. Each damper allows independent adjustment of the area of the vent aperture (fully closed, fully open, or positions in-between) and thus the airflow through the vent. Adjustment of airflow allows the user to control the cooking heat and speed by controlling the rate of fuel combustion, and also allows the user to control the amount of smoke retained in the kettle when the lid is in place. In one or more embodiments, the position and shape of the dampers and air vents, as well as the shape of the bottom bowl and lid, promote even airflow and temperature throughout the grill, resulting in consistent cooking.

In one or more embodiments, the apparatus of the present invention includes a disc-shaped fuel brick ("fuel disc") made from charcoal, and optionally including hardwood chips (e.g., mesquite, hickory, cherry wood) to add flavor and smoke. Lighter fluid and/or alcohol may be incorporated into the fuel disc to allow instant lighting of the fuel disc without additional fire-starting materials or substances. In one or more embodiments, the fuel disc may include a wick to facilitate lighting. In one or more embodiments, one or more apertures are formed in the fuel disc that allow air to flow through the disc. The size and location of the apertures in the fuel disc determine the burn rate of the fuel disc, and therefore the amount of heat produced at any given time and the total burn time of the disc. The size and location of the apertures influence the pattern of airflow throughout the grill and therefore the distribution of heat throughout the grill. In one or more embodiments, the fuel disc apertures are sized and positioned to provide between one and two hours of burn time and to allow the inside of the grill to reach temperatures of approximately 500-600 degrees Fahrenheit (260-315 degrees Celsius). In one or more embodiments, the fuel disc apertures are sized and positioned to promote even airflow and temperature distribution throughout the grill. In one or more embodiments, the fuel disc is larger in size and the apertures are sized and positioned to produce large, bright flames for several hours (similar to a manufactured firelog), which allows the kettle to be used as a "fire pit".

In one or more embodiments, one or more of the metal components of the apparatus of the present invention are formed with integral stiffening ribs to provide strength and rigidity yet be light in weight. In one or more embodiments, lettering, logos, artistic designs, or the like may be stamped or embossed into one or more of the metal components instead of or in addition to the integral stiffening ribs. In one or more embodiments, an adhesive strip thermometer may be applied to the metal components (e.g., the lid of the grill). In one or more embodiments, the thermometer scale encompasses the normal operating temperatures of the grill (e.g., from approximately 200 to 600 degrees Fahrenheit or 95 to 315 degrees Celsius).

In one or more embodiments, the apparatus of the present invention is inexpensive to manufacture and sell and is entirely or partly made of recycled and/or recyclable materials, so the user may choose to recycle or dispose of the grill after a single use. In one or more embodiments, the apparatus of the present invention is durable enough that the user may choose to reuse it several times before recycling or disposal. In one or more embodiments, additional fuel discs of the present invention may be sold separately from the barbecue grill of the present invention so that the barbecue grill may be used many times before recycling or disposal.

BRIEF DESCRIPTION OF THE DRAWINGS

The present invention may be better understood, and its features made apparent to those skilled in the art by referencing the accompanying drawings.

The use of the same reference symbols in different drawings indicates similar or identical items.

DETAILED DESCRIPTION OF THE INVENTION

Figure 1:
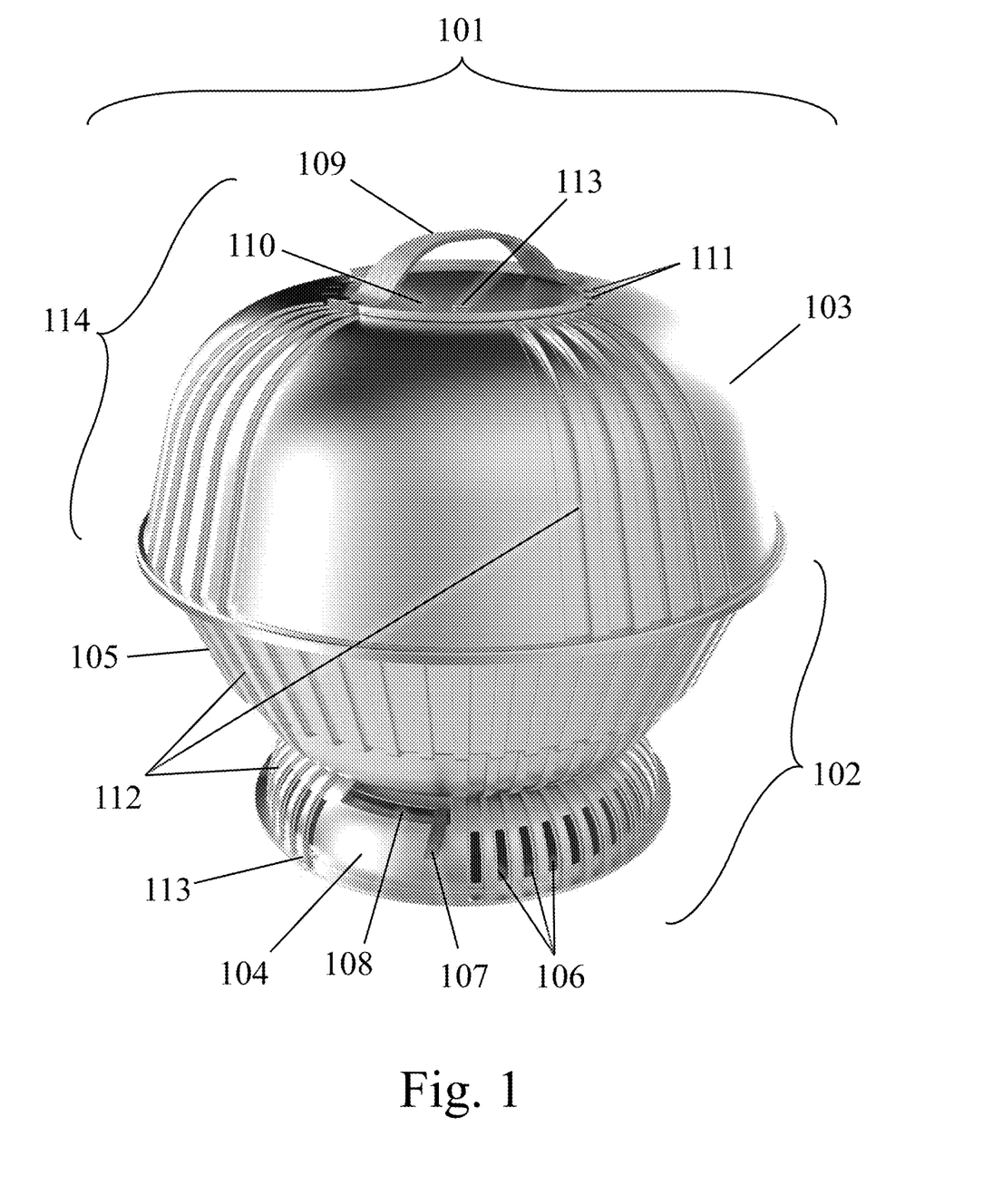
FIG. 1 is a perspective view of an assembled barbecue grill, which is an embodiment of the present invention.
Figure 2:
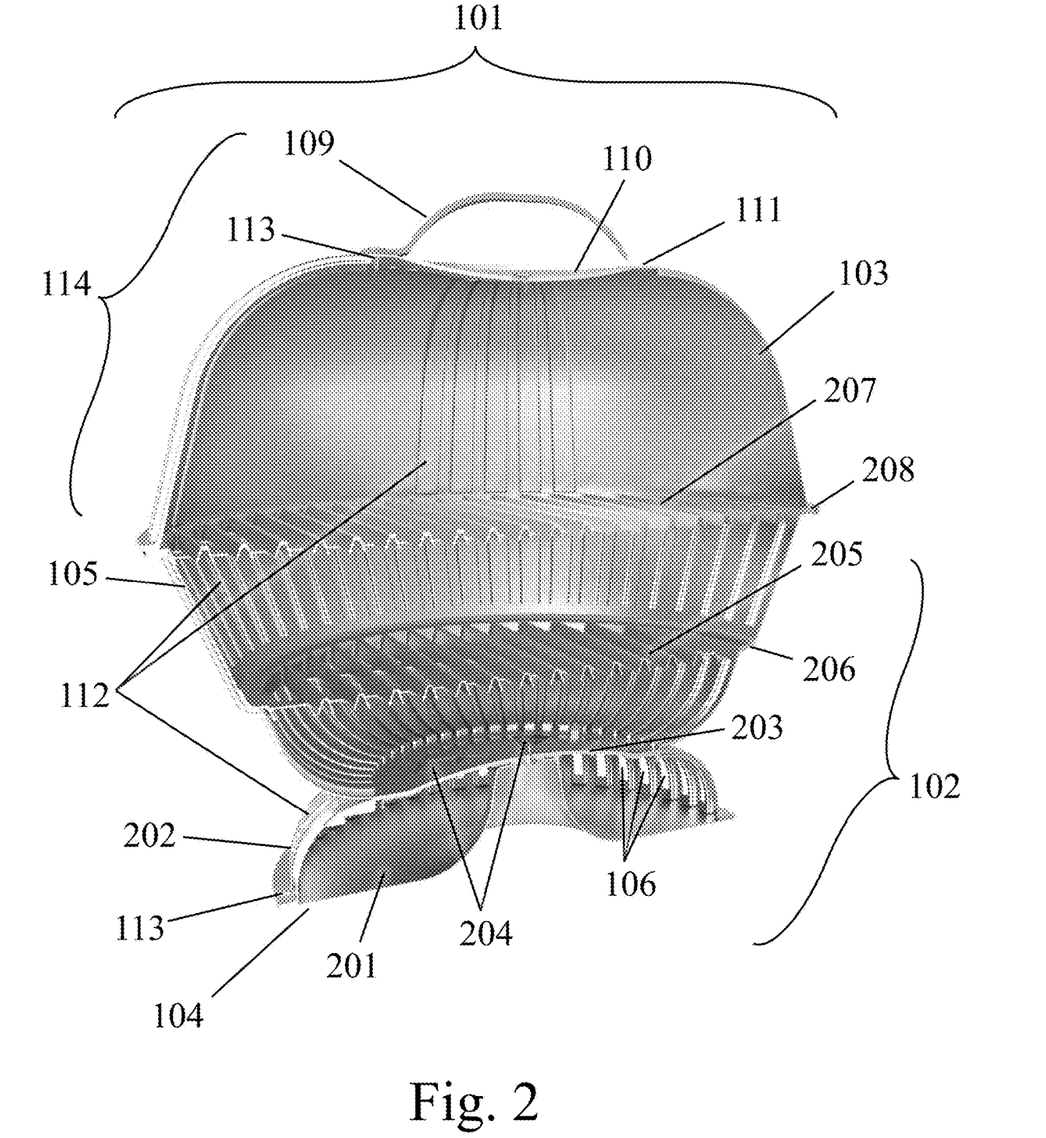
FIG. 2 is a cutaway view of the embodiment of the present invention of FIG. 1.
Figure 3:
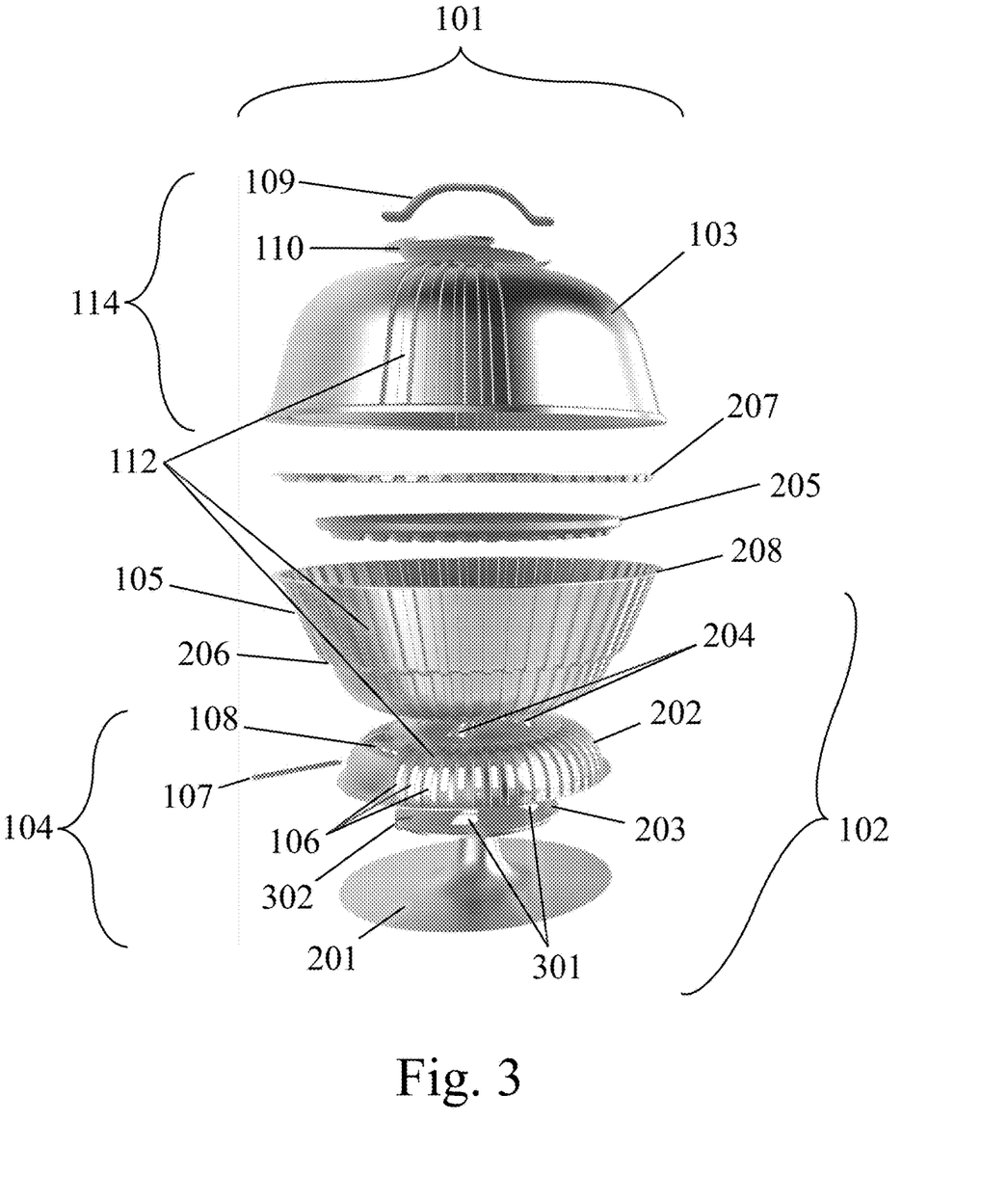
FIG. 3 is an exploded view of the components of the embodiment of the present invention of FIG. 1.

A portable, lightweight, disposable kettle-type barbecue grill, a fuel disc for use with the grill, and methods for fabricating, packaging, and using such a grill and fuel disc, are presented. FIGS. 1-3 show an embodiment of a barbecue grill 101 of the present invention. FIG. 1 is a perspective view of an assembled barbecue grill 101, which is an embodiment of the present invention. FIG. 2 is a cutaway view of barbecue grill 101, and FIG. 3 is an exploded view of the components of barbecue grill 101. In one or more embodiments, barbecue grill 101 has a circular-shaped cross section when viewed from above, but other shapes or configurations are possible, such as a rectangular or oval cross section when viewed from above.

In the embodiment of FIGS. 1-3, barbecue grill 101 includes bowl assembly 102 and lid assembly 114. Bowl assembly 102 forms the lower portion of barbecue grill 101 and includes support base assembly 104 and bottom bowl 105. In one or more embodiments, bottom bowl 105 has a roughly hemispherical shape, with generally conical sides and a concave bottom as shown in FIG. 2. Support base assembly 104 includes intake apertures 106 and intake damper adjustment lever 107 which extends through intake damper adjustment lever aperture 108. Lid assembly 114 forms the upper portion of barbecue grill 101 and includes lid 103, lid handle 109, exhaust damper 110, and exhaust apertures 111. In one or more embodiments, lid 103 has a roughly hemispherical shape, with generally conical sides and a concave top as shown in FIG. 2. In one or more embodiments, lid 103, support base assembly 104, and bottom bowl 105 have integral stiffening ribs 112 which provide strength and stiffness to barbecue grill 101 and allow lid 103, support base assembly 104, and bottom bowl 105 to be made of thin-walled material for light weight. In one or more embodiments, lettering, logos, artistic designs, or the like may be stamped or embossed into lid 103, support base assembly 104, bottom bowl 105, or any of the other components of barbecue grill 101 instead of or in addition to integral stiffening ribs 112.

FIGS. 2-3 show additional detail and interior components not visible in FIG. 1. Support base assembly 104 includes ash catcher 201, support base 202, intake damper 203, and intake damper adjustment lever 107. Support base 202 has intake apertures 106 and internal air vent apertures 204 which channel airflow through support base assembly 104 into bottom bowl 105. The upward curving shape of ash catcher 203 redirects the incoming air, which initially flows horizontally through intake apertures 106 across ash catcher 201, into a vertical, upward moving column of air that flows through internal air vent apertures 204 to the fuel in bottom bowl 105.

In the embodiment of FIGS. 1-3, intake damper 203 is positioned against the underside of support base 202 and is rotatable generally around the vertical center axis of support base 202. Intake damper 203 has damper apertures 301 which align with internal air vent apertures 204 of support base 202 and bottom bowl 105 when intake damper 203 is rotated to the "open" position. When intake damper 203 is rotated toward the "closed" position, damper apertures 301 move out of alignment with internal air vent apertures 204, progressively reducing the total aperture area for air to flow through. When intake damper 203 is in the fully "closed" position, little to no air flows through internal air vent apertures 206. Intake damper adjustment lever 107 fits into slot 302 in intake damper 203 and extends through intake damper adjustment lever aperture 108 in support base 202. Intake damper adjustment lever 107 thereby allows the user to rotate intake damper 203 between fully-closed and fully-open positions, or any position in-between, allowing control over the amount of air flowing into bottom bowl 105. Intake damper adjustment lever 107 thus allows the user to control the rate of fuel combustion and the temperature inside barbecue grill 101.

In the embodiment of FIGS. 1-3, exhaust damper 110 is positioned against the top of lid 103 and is rotatable generally around the central vertical axis of lid assembly 114. Lid handle 109 is affixed to exhaust damper 110 to permit rotation of exhaust damper 110 by rotating lid handle 109. Lid 103 has exhaust apertures 111 which are uncovered when exhaust damper 110 is rotated to the "open" position. When exhaust damper 110 is rotated toward the "closed" position, it progressively covers exhaust apertures 111, reducing the total aperture area for air to flow through. When exhaust damper 110 is in the fully "closed" position, little to no air flows through exhaust apertures 111. Exhaust damper 110 thus allows the user to control the amount of smoke retained inside barbecue grill 101, and, in conjunction with intake damper adjustment lever 107, to control the rate of fuel combustion. In one or more embodiments, the position and shape of intake apertures 106, internal air vent apertures 206, damper apertures 301, ash catcher 201, bottom bowl 105, lid 103, and exhaust apertures 111 promote even airflow and temperature throughout the grill, resulting in consistent cooking.

Figure 4:
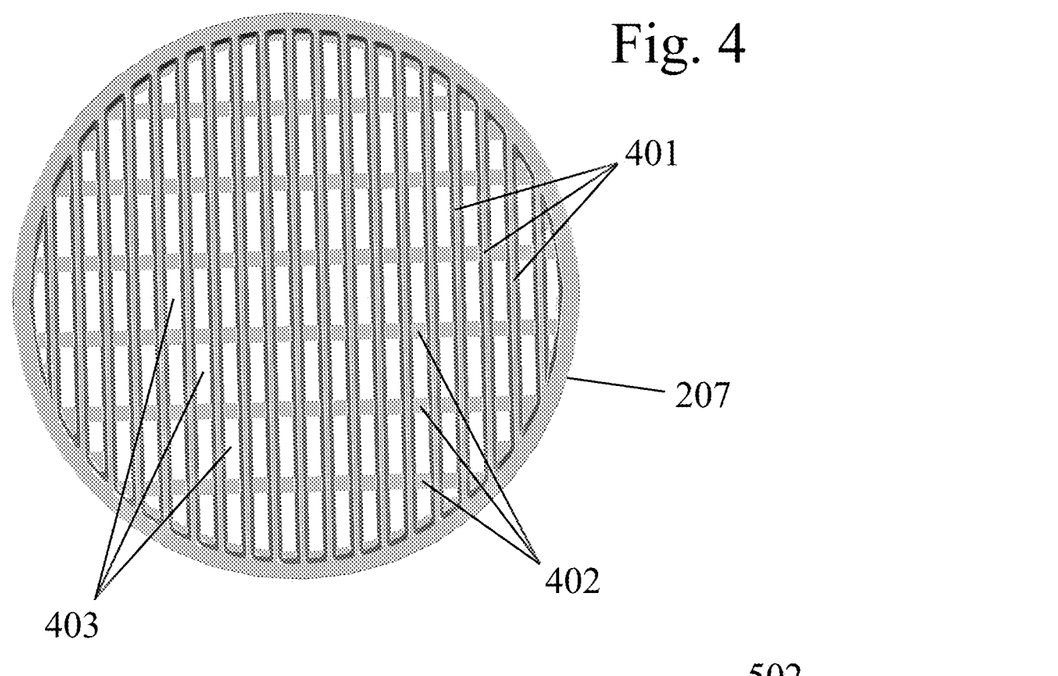
FIG. 4 is a top view of the cooking grill of the embodiment of the present invention of FIG. 1.

FIG. 4 shows a top view of cooking grill 207 of the embodiment of FIGS. 1-3. In the embodiment of FIGS. 1-3 and FIG. 4, cooking grill 207 rests upon upper lip 208 of bottom bowl 105 to provide a cooking surface. In one or more embodiments, cooking grill 207 is made of parallel-oriented support members 401 with cross members 402 at right angles to parallel support members 401, forming a grid with apertures 403 for air to flow through. In one or more embodiments, the parallel support members 401 have an inverted V-shaped cross section so they can be thin-walled for light weight while providing strength and rigidity sufficient to support the weight of the food being cooked. In one or more embodiments, the inverted V-shaped cross section concentrates the heat of the burning fuel into a small area to produce grill marks on the food, which may be desirable.

Figure 5:
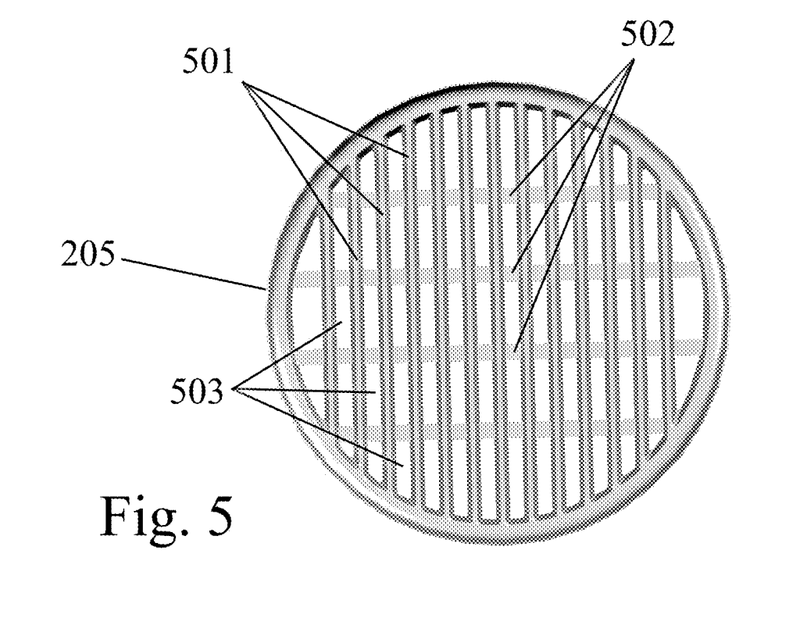
FIG. 5 is a top view of the charcoal tray of the embodiment of the present invention of FIG. 1.

FIG. 5 shows a top view of charcoal tray 205 of the embodiment of FIGS. 1-3. In the embodiment of FIGS. 1-3 and FIG. 5, charcoal tray 205 rests upon lower lip 206 of bottom bowl 105 to provide support and airflow for the charcoal or other fuel that is burned in bottom bowl 105. In one or more embodiments, charcoal tray 205 comprises parallel-oriented support members 501 with cross members 502 at right angles to parallel support members 501, forming a grid with apertures 503 for air to flow through. In one or more embodiments, parallel support members 501 have an inverted V-shaped cross section so they can be thin-walled for light weight while providing strength and rigidity sufficient to support the weight of the charcoal or other fuel.

In one or more embodiments, one or more of lid 103, bottom bowl 105, ash catcher 201, support base 202, intake damper 203, charcoal tray 205, cooking grill 207, and exhaust damper 110 are made of stamped, forged, sintered, or cast aluminum alloy, aluminum sheet, or aluminum foil, for light weight and strength. In one or more embodiments, one or more of lid 103, bottom bowl 105, ash catcher 201, support base 202, intake damper 203, charcoal tray 205, cooking grill 207, and exhaust damper 110 may instead be made of steel or other structural metals, or ceramic, or any other material that retains its structural properties at barbecue grill 101's operating temperature. In one or more embodiments, lid handle 109 and intake damper adjustment lever 107 are made of bamboo for light weight, strength, and low thermal conductivity so they are cool to the touch when the metal components are hot. In one or more embodiments, lid handle 109 and intake damper adjustment lever 107 may instead be made of polymer, composite materials, natural materials such as wood, or any other material that retains the desired properties at barbecue grill 101's operating temperature. In one or more embodiments, bottom bowl 105, ash catcher 201, support base 202, and intake damper 203 are configured to be affixed together using fasteners 113 to form bowl assembly 102. Similarly, lid 103, exhaust damper 110, and lid handle 109 are configured to be affixed together using fasteners 113 to form lid assembly 114. In one or more embodiments, fasteners 113 are brass brads. In one or more embodiments, components may be affixed together using any other suitable method or fastener, including, for example, screws, rivets, adhesive, welding, or bendable tabs on the components. In one or more embodiments, the components of barbecue grill 101 are shipped and sold in a compact, disassembled configuration, and are configured to be easily assembled together by the user before use. In one or more embodiments, the sum of the weights of the components of barbecue grill 101 is less than 25 ounces or 700 grams. In one or more embodiments, the diameter of cooking grill 207, lid 103, and bottom bowl 105 is approximately 14 inches (36 cm), which is suitable for cooking food for 3-4 people. In one or more embodiments, the diameter of cooking grill 207, lid 103, and bottom bowl 105 is approximately 18 inches (46 cm), which is suitable for cooking food for 6-8 people. In one or more embodiments, the diameter of cooking grill 207, lid 103, and bottom bowl 105 is approximately 9 inches (23 cm), which is suitable for cooking food for 1-2 people. In one or more embodiments, the diameter of cooking grill 207, lid 103, and bottom bowl 105 is approximately 3 inches (7.5 cm), which is suitable for, e.g., roasting marshmallows to make s'mores. However, the invention is not limited to any particular sizes or dimensions.

In the embodiment of FIGS. 1-5, the components of barbecue grill 101 are inexpensive to manufacture and are entirely or partly made of recycled and/or recyclable materials, so the user may choose to recycle or dispose of barbecue grill 101 after a single use. However, in the embodiment of FIGS. 1-5, barbecue grill 101 is durable enough that the user may choose to reuse it several times before recycling or disposal.

Figures 6A, 6B:
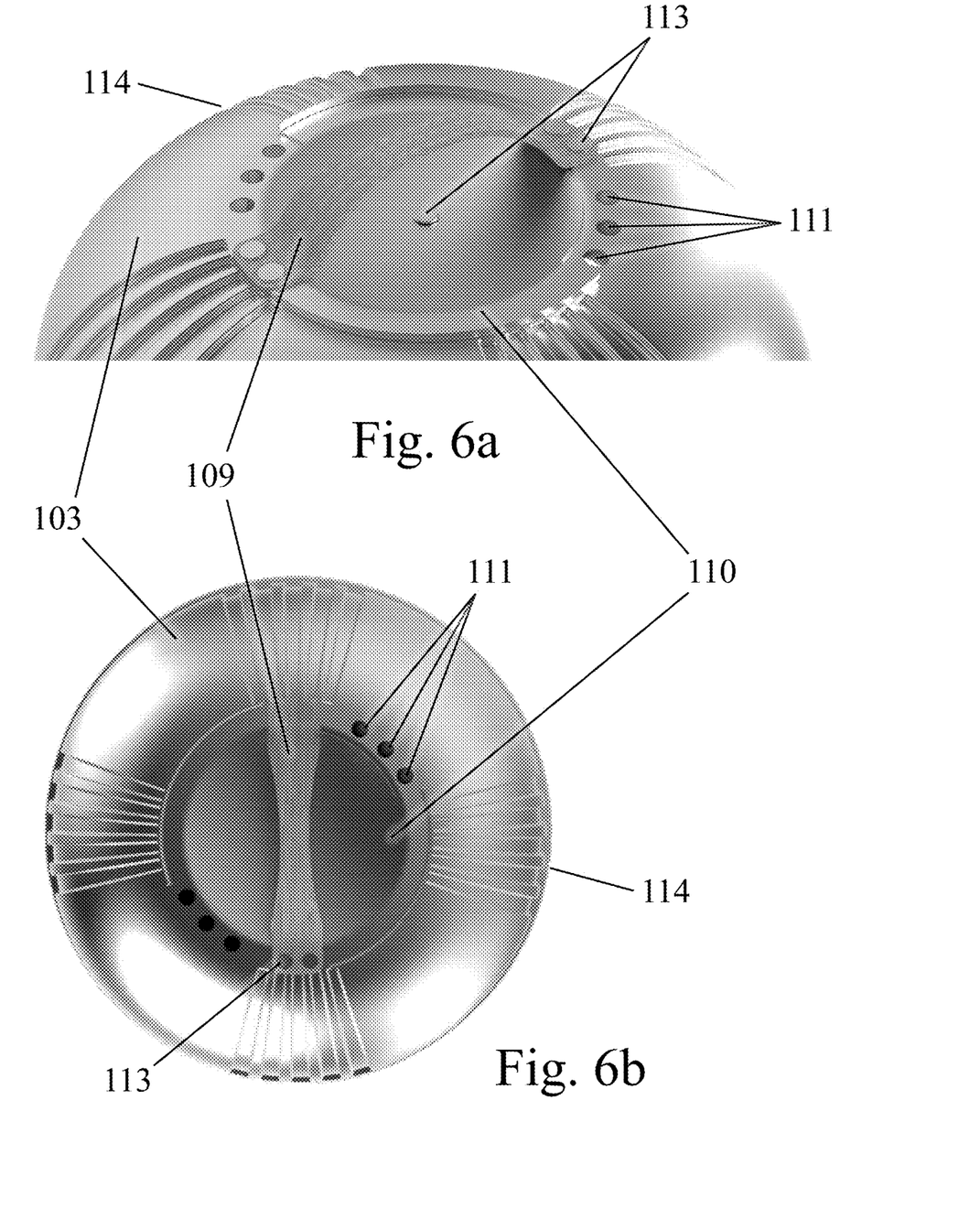
FIG. 6a is a detail perspective view of the lid of the embodiment of the present invention of FIG. 1.
FIG. 6b is a top view of the lid of the embodiment of the present invention of FIG. 1 showing the exhaust damper in the fully open position.
Figures 6C, 6D:
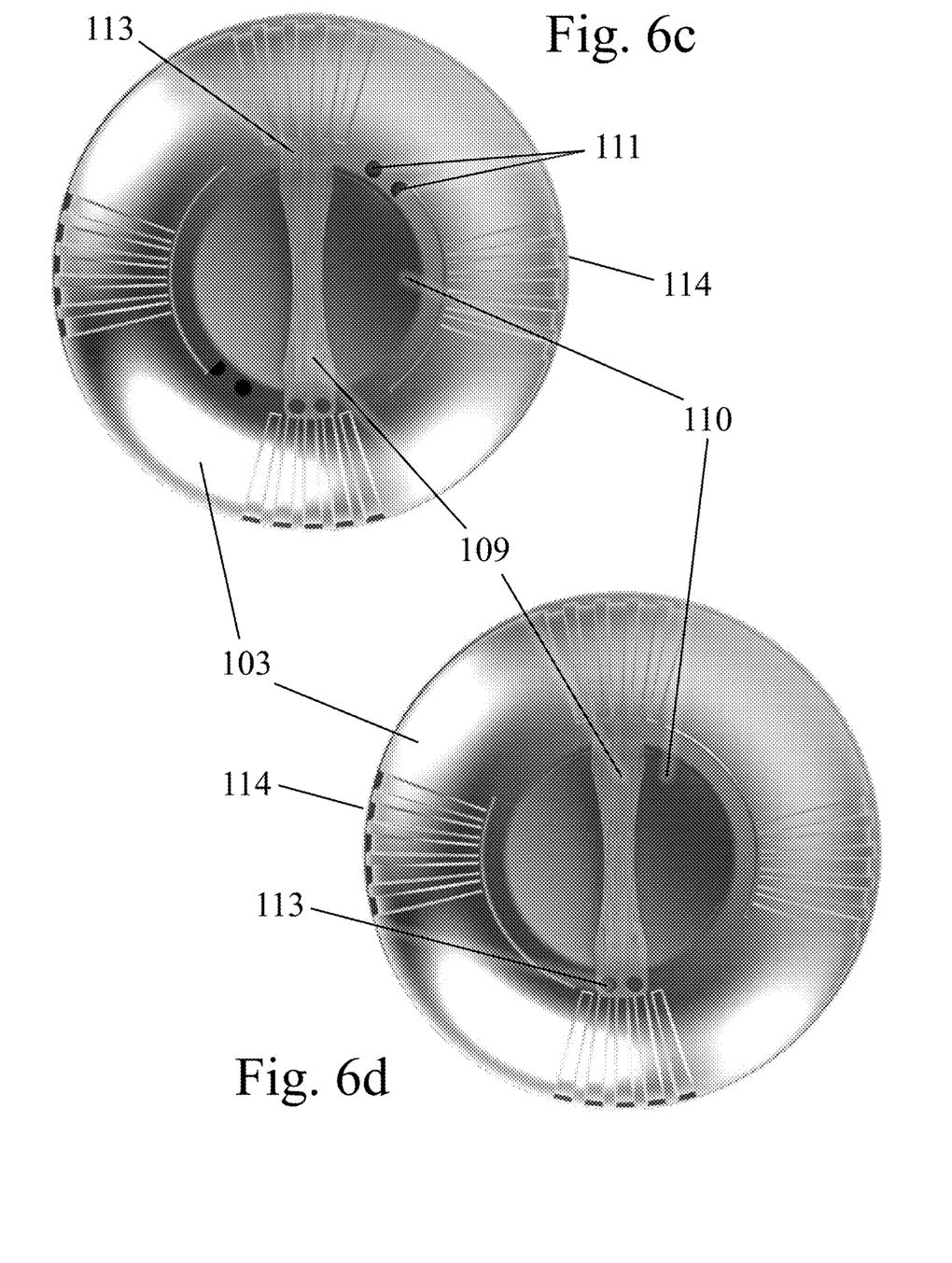
FIG. 6c is a top view of the lid of the embodiment of the present invention of FIG. 1 showing the exhaust damper in a partially open position.
FIG. 6d is a top view of the lid of the embodiment of the present invention of FIG. 1 showing the exhaust damper in the fully closed position.

FIGS. 6a-6d show a detail view of lid 103, lid handle 109, exhaust damper 110, exhaust apertures 111, and fasteners 113 of the embodiment of the present invention shown in FIGS. 1-3. FIGS. 6a and 6b show exhaust damper 110 in the fully open position. FIG. 6c shows exhaust damper 110 in a partially open position. FIG. 6d shows exhaust damper 110 in the fully closed position.

Figure 7A:
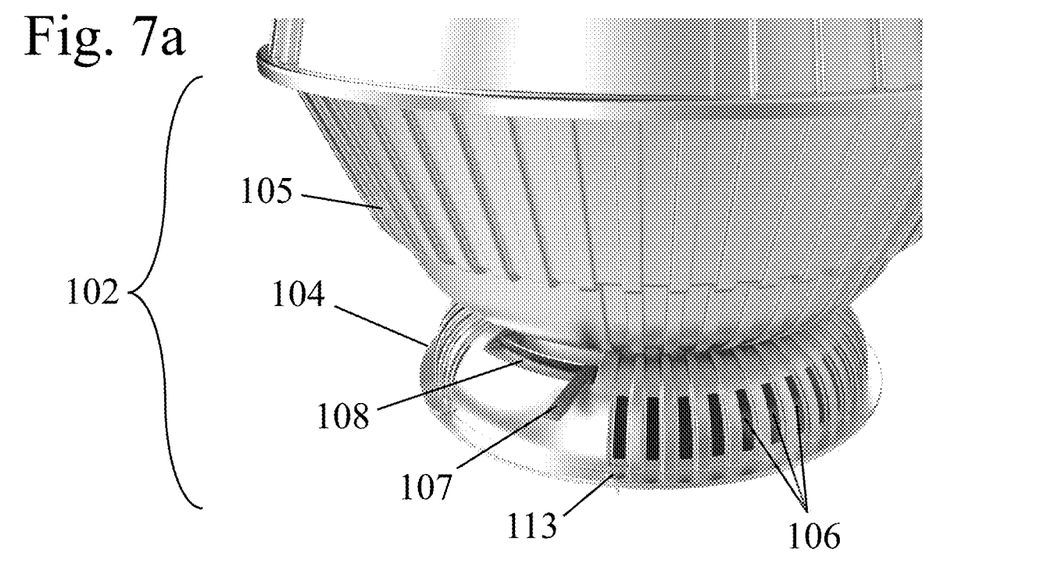
FIG. 7a is a detail perspective view of the embodiment of the present invention of FIG. 1 showing the intake damper in the fully closed position.
Figure 7B:
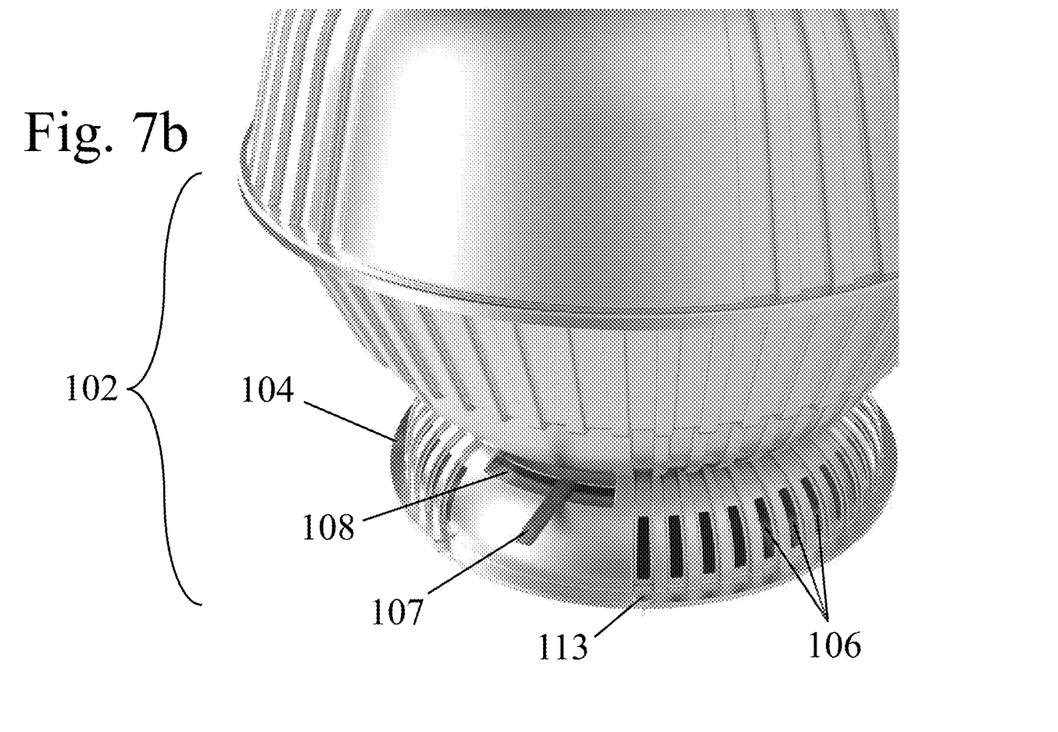
FIG. 7b is a detail perspective view of the kettle of the embodiment of the present invention of FIG. 1 showing the intake damper in a partially open position.

FIGS. 7a and 7b show a detail view of support base assembly 102 of the embodiment of the present invention shown in FIGS. 1-3. FIG. 7a shows intake damper adjustment lever 107 in the fully closed position. FIG. 7b shows intake damper adjustment lever 107 in a partially open position.

Figure 8:
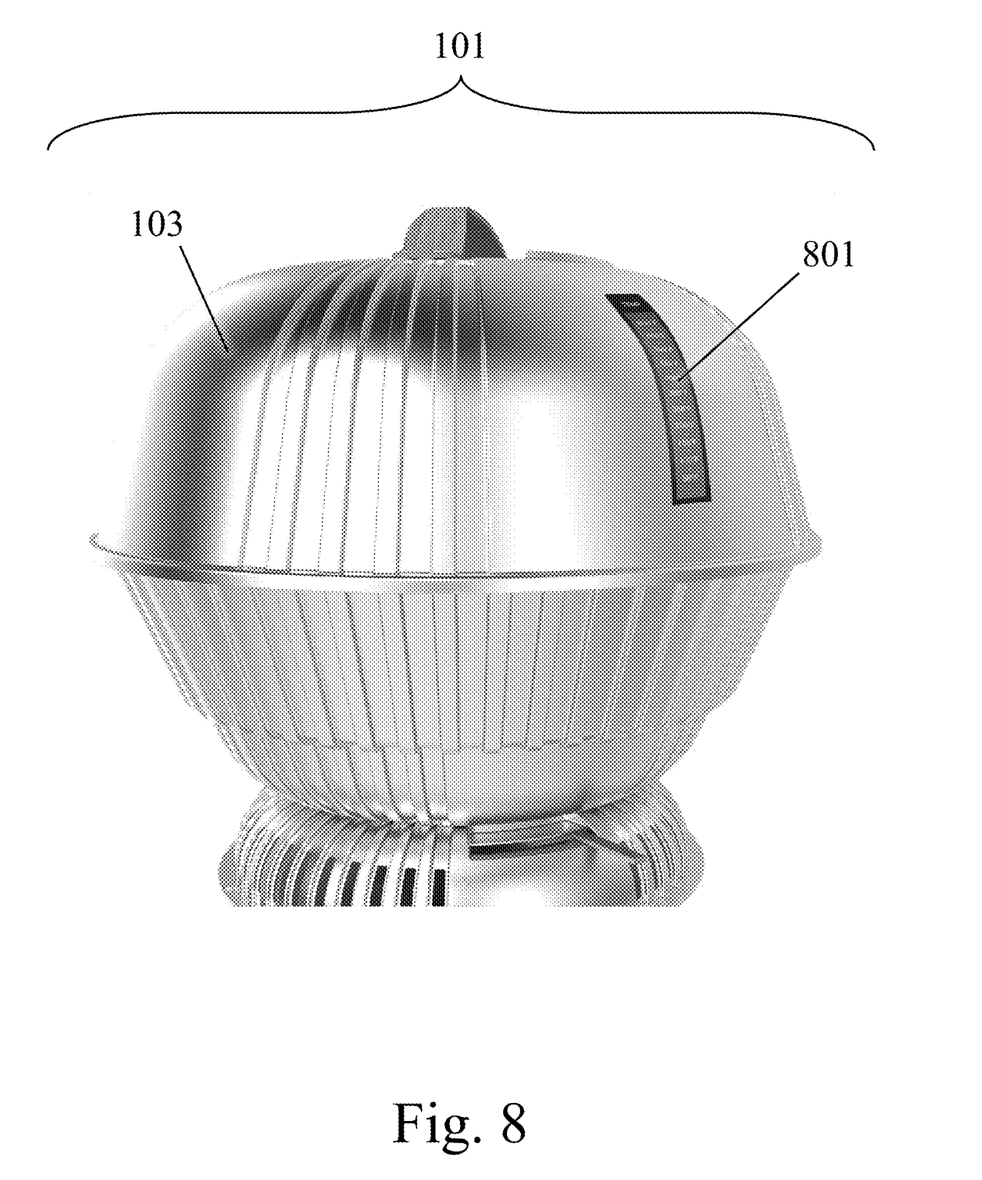
FIG. 8 is a perspective view of an assembled barbecue grill with thermometer, which is an embodiment of the present invention.

FIG. 8 shows an embodiment of barbecue grill 101 with a thermometer 801 affixed to lid 103. Thermometer 801 indicates the temperature of the grill to the user to aid in cooking. In the embodiment of FIG. 8, thermometer 801 is a prior art liquid crystal thermometer having rows of liquid crystal material that change color at different temperatures along a calibrated scale. Liquid crystal thermometers are preferred for this application because they are lightweight, inexpensive, durable, and accurate. In one or more embodiments, thermometer 801 may instead be a liquid-in-glass, liquid-in-plastic, electronic, or any other type of thermometer. In one or more embodiments, thermometer 801 is affixed to lid 103 with adhesive, screws, rivets, or any other suitable fastener or material. In one or more embodiments, the scale of thermometer 801 encompasses the normal operating temperatures of the grill (e.g., from approximately 200 to 600 degrees Fahrenheit or 95 to 315 degrees Celsius).

Figure 9:
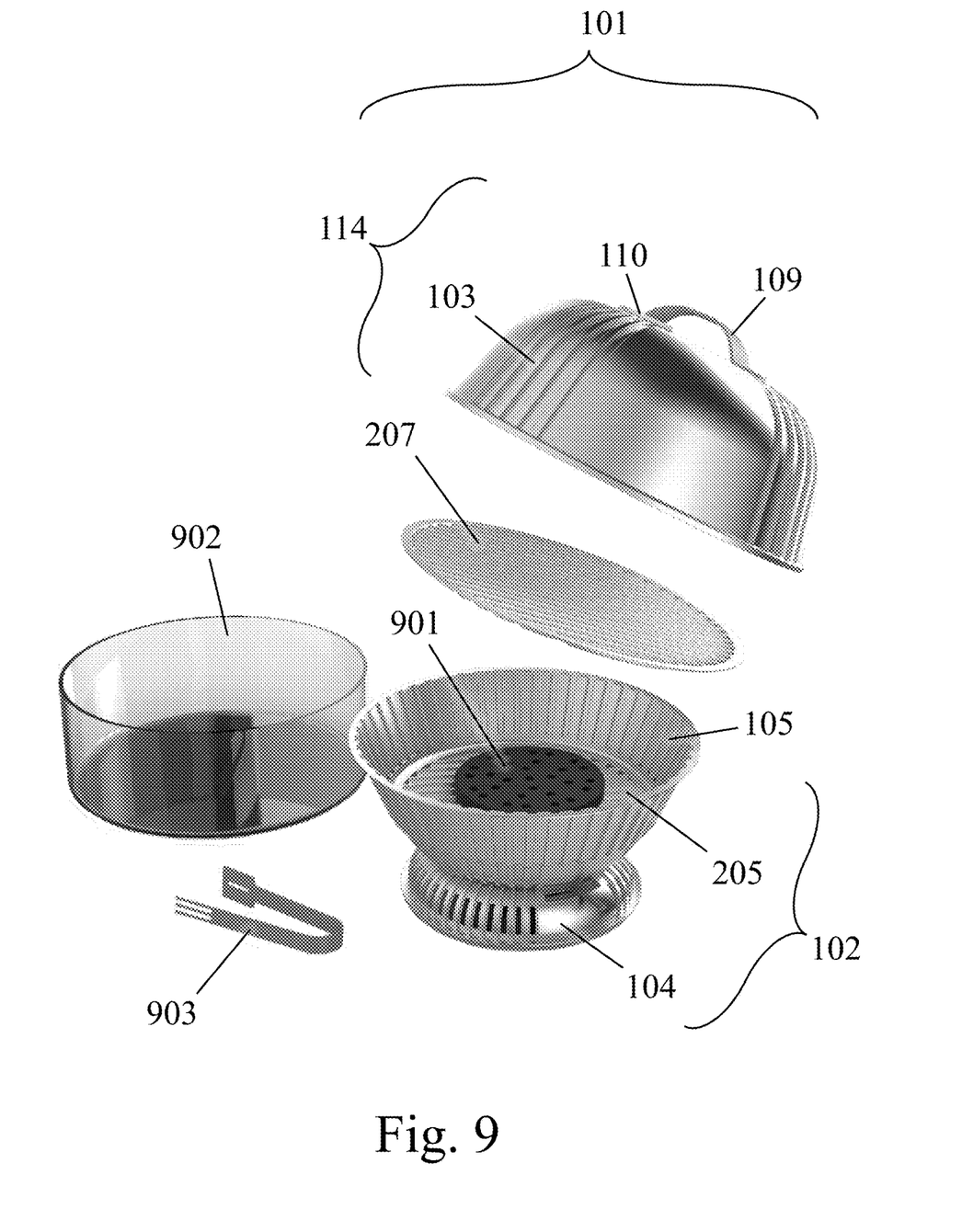
FIG. 9 is a perspective view of a barbecue grill, fuel disc, serving bowl, and tongs, which is an embodiment of the present invention.

FIGS. 9 and 10a-10e show an embodiment of the present invention, including the above-described components of barbecue grill 101, along with fuel disc 901, serving bowl 902, and tongs 903. In one or more embodiments, serving bowl 902 is made of vacuum-formed or injection-molded polycarbonate, acrylic, ABS, other polymers, or any other material suitable for shipping and storing the components of the invention. In one or more embodiments, tongs 903 have a planar, optionally slotted, shape on one side for use as a spatula and a forked shape on the other side for use as a serving fork, as shown in FIG. 9. In one or more embodiments, tongs 903 are made of bamboo, wood, polymer, aluminum, steel, or any other material suitable for use with food. In one or more embodiments, additional cooking utensils or grilling tools may be included, such as a spatula, fork, knife, or grill brush. In one or more embodiments, matches may be included for lighting fuel disc 901. In one or more embodiments, additional fuel discs 901 may be sold separately from barbecue grill 101 so that barbecue grill 101 may be used many times before recycling or disposal. Fuel disc 901 is described further below with reference to FIGS. 11 and 12a-12c.

Figure 10A:
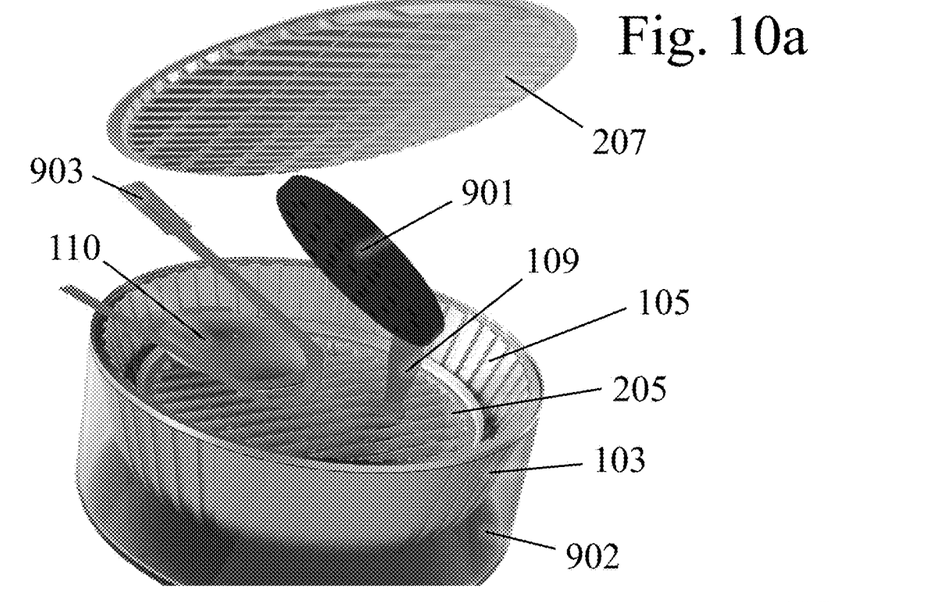
FIG. 10a is an exploded view of the components of the embodiment of the present invention of FIG. 9 as they are nested for shipping and storage.
Figure 10B:
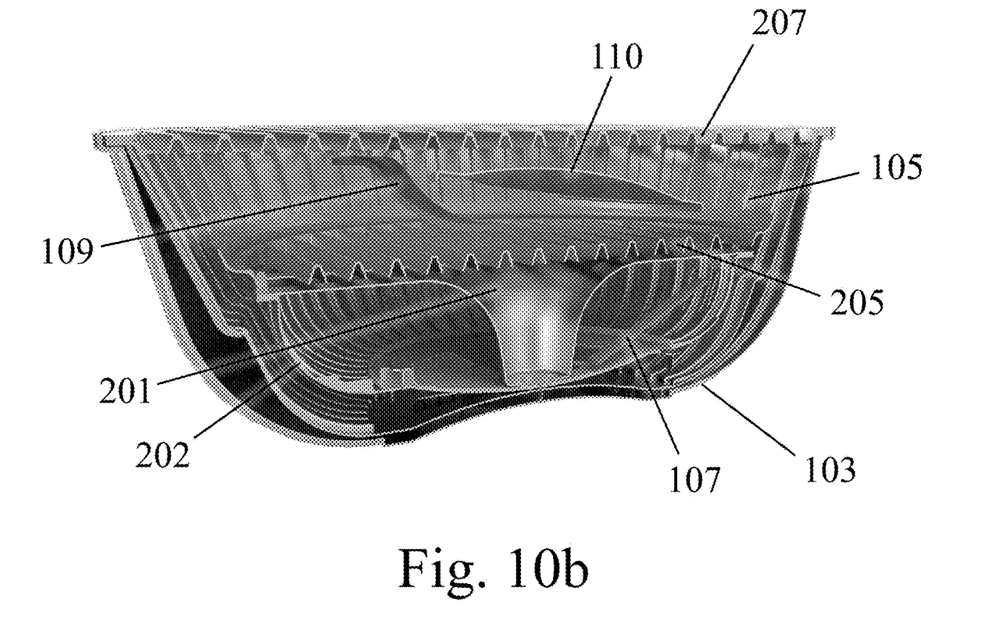
FIG. 10b is a cutaway view of some of the components of the embodiment of the present invention of FIG. 9 as they are nested for shipping and storage.
Figures 10C, 10D, 10E:
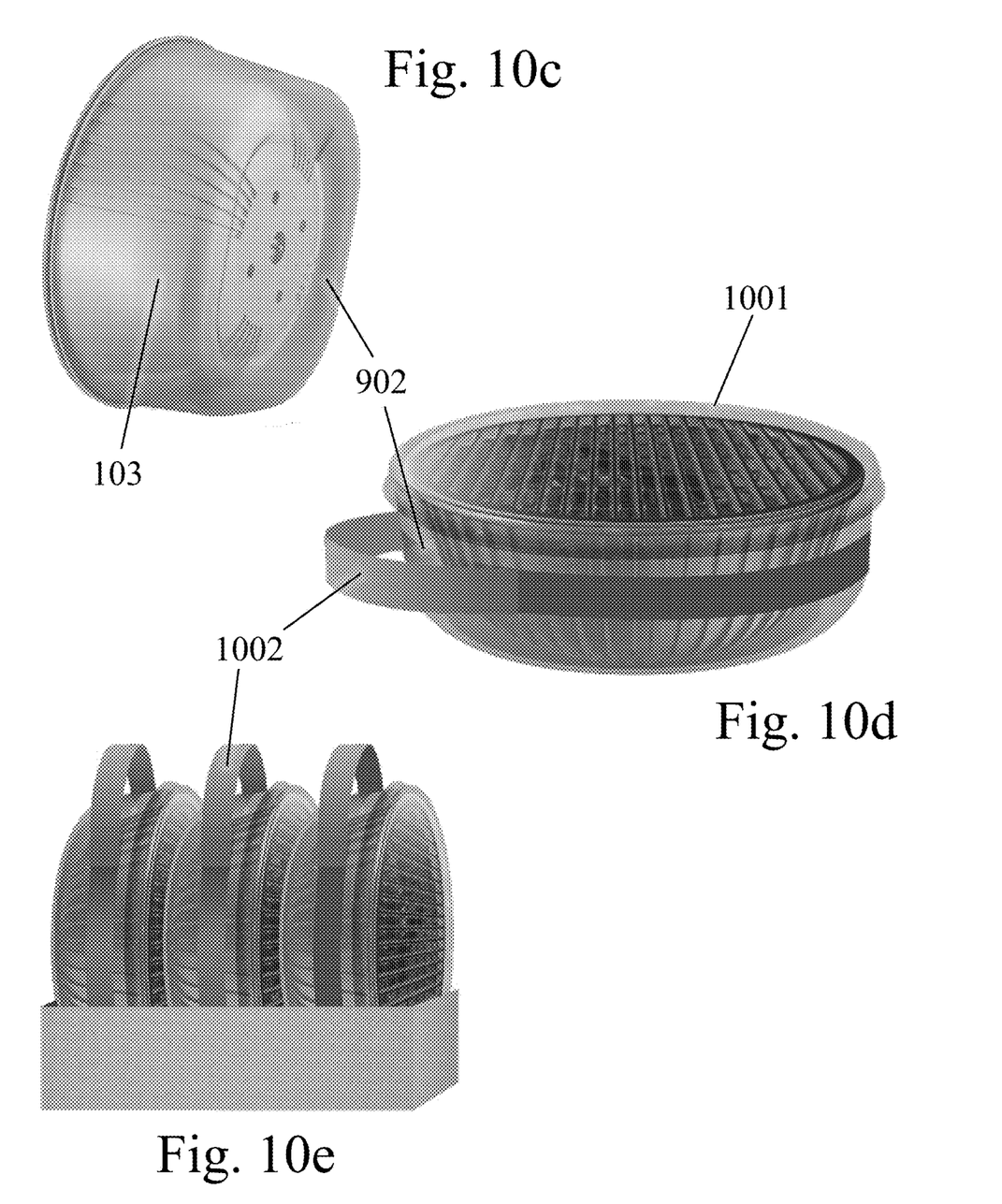
FIG. 10c is a perspective view of the components of the embodiment of the present invention of FIG. 9 as they are nested for shipping and storage.
FIG. 10d is a perspective view of the components of an embodiment of the present invention as they are nested for shipping and storage.
FIG. 10e is a perspective view of three of the embodiments of the present invention of FIG. 10d shown in a shipping and storage box.

In the embodiment of FIGS. 9 and 10a-10e, the components of the invention are configured to nest inside one another to maximize space efficiency and portability, with serving bowl 902 used as a shipping and storage container to protect the other components. In one or more embodiments, the components of the invention are nested in the following order: serving bowl 902, lid 103, bottom bowl 105, support base 202, intake damper adjustment lever 107, ash catcher 201, charcoal tray 205, lid handle 109, tongs 903, fuel disc 901, exhaust damper 110, and cooking grill 207, although the components may be designed to nest in a different order. In the embodiment of FIGS. 10c-10e, cap 1001 fits tightly over serving bowl 902 to seal the components of the invention inside serving bowl 902. In one or more embodiments, the invention is sold to the user in the nested configuration, and is intended to be subsequently unpacked and assembled by the user before use.

In the embodiment of FIGS. 10d and 10e, a carrying handle 1002 is affixed to serving bowl 902 to allow convenient handling and attractive display of the invention. In one or more embodiments, carrying handle 1002 may be printed with a product name, assembly instructions, a UPC bar code, or any other information or graphic designs. In the embodiment of FIG. 10e, three packaged barbecue grills are displayed in a box.

FIGS. 11 and 12a-12c show an embodiment of fuel disc 901 of the present invention. In one or more embodiments, fuel disc 901 is made by pressing approximately 200 grams (the equivalent of approximately 8-10 briquettes) of powdered or granulated charcoal into a disc shape, using cornstarch and water as binding agents. Charcoal is a preferred fuel because it burns efficiently and produces very little ash. In one or more embodiments, fuel disc 901 incorporates hardwood chips (e.g., mesquite, hickory, cherry wood) into the charcoal to add flavor and smoke and to control the rate at which fuel disc 901 burns. For example, distributing hardwood chips evenly throughout fuel disc 901 reduces the maximum temperature at which the charcoal burns and extends the burn time of fuel disc 901. In one or more embodiments, fuel disc 901 incorporates lighter fluid and/or alcohol to reduce smoke and allow instant lighting of the fuel disc without additional fire-starting materials or substances. In one or more embodiments, the fuel disc may include a wick to facilitate lighting. In one or more embodiments, the wick is made of cloth (for example, cotton) and impregnated with a combustible substance (for example, lighter fluid, alcohol, oil, or wax). The wick may be located at or near the center of fuel disc 901 and extend approximately perpendicularly from the surface of fuel disc 901. Alternatively, one or more wicks may be located at or near the edge of fuel disc 901. In one or more embodiments, fuel disc 901 incorporates paper pulp, sawdust, or other combustible materials instead of or in addition to charcoal or wood to alter the combustion properties of fuel disc 901.

Figure 11:
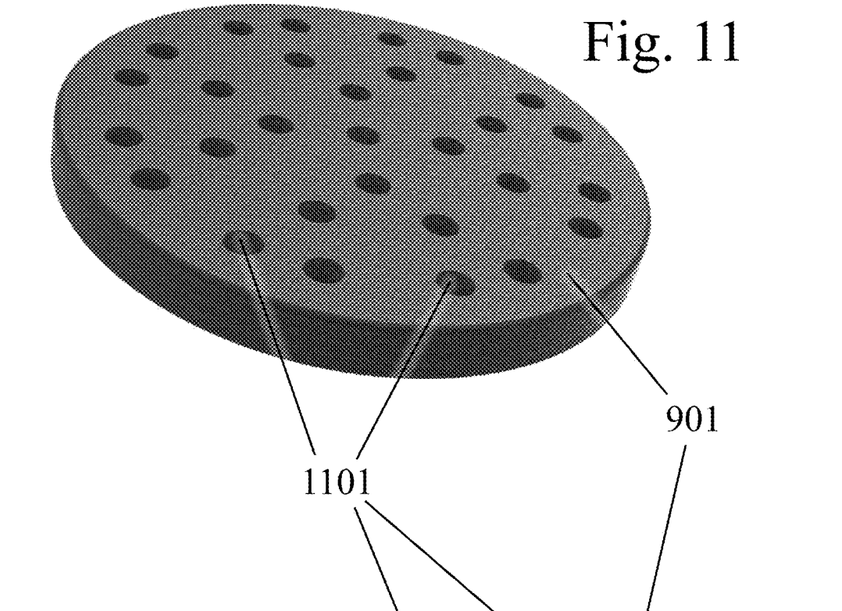
FIG. 11 is a perspective view of a fuel disc of an embodiment of the present invention.

In one or more embodiments, one or more apertures 1101 are formed in fuel disc 901 which allow air to flow through fuel disc 901. The size and location of apertures 1101 in fuel disc 901 determine the burn rate of fuel disc 901, and therefore the amount of heat produced at any given time and the total burn time of fuel disc 901. For example, more apertures or larger-sized apertures allow more airflow and increase the surface area of fuel disc 901, producing higher temperatures and a shorter burn time. The size and location of apertures 1101 also influence the pattern of airflow through charcoal fuel disc 901 and throughout the grill, and therefore the distribution of heat throughout the grill.

Figure 12A:
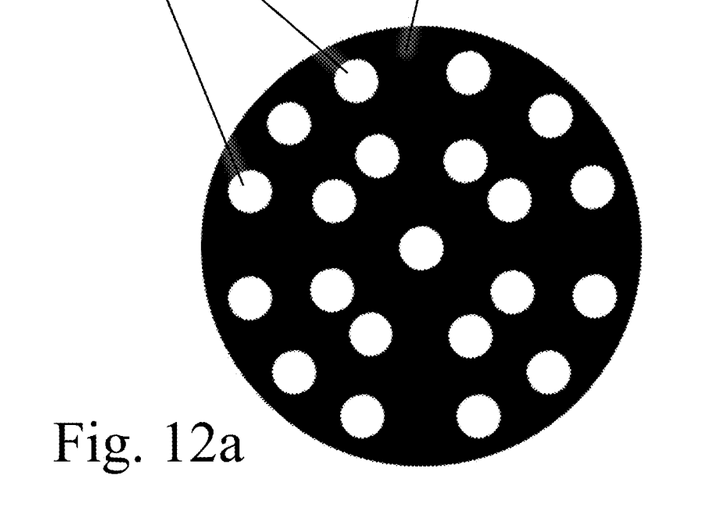
FIG. 12a is a top view of a fuel disc of an embodiment of the present invention.
Figure 12B:
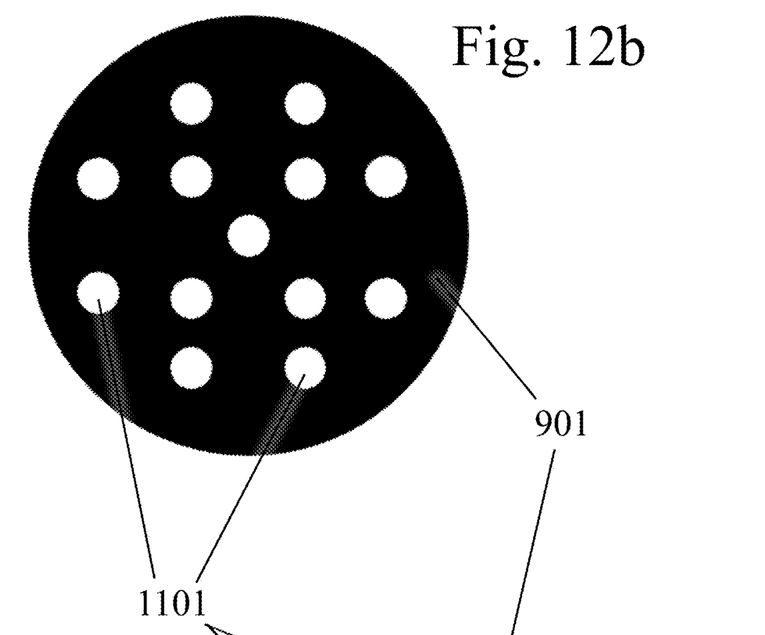
FIG. 12b is a top view of a fuel disc of an embodiment of the present invention.
Figure 12C:
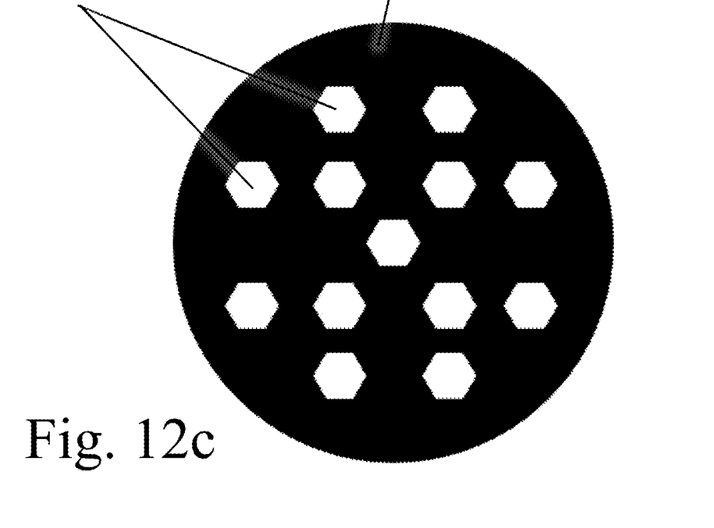
FIG. 12c is a top view of a fuel disc of an embodiment of the present invention.

In the embodiments of FIGS. 12a-12c, fuel disc 901 is approximately six inches in diameter and 0.75 inches thick. In the embodiment of FIG. 12a, fuel disc 901 has twenty-one apertures 1101 of circular cross-section and was experimentally determined to have a burn time of one hour and reach a maximum temperature inside closed barbecue grill 101 of 600 degrees Fahrenheit (315 degrees Celsius). In the embodiment of FIG. 102b, fuel disc 901 has thirteen apertures 1101 of circular cross-section and was experimentally determined to have a burn time of one hour and fifteen minutes and reach a maximum temperature inside closed barbecue grill 101 of 520 degrees Fahrenheit (271 degrees Celsius). In the embodiment of FIG. 12c, fuel disc 901 has thirteen apertures 1101 of hexagonal cross-section and was experimentally determined to have a burn time of one hour and fifteen minutes and reach a maximum temperature inside closed barbecue grill 101 of 520 degrees Fahrenheit (271 degrees Celsius). In one or more embodiments, fuel disc 901 may be thicker to provide a longer burn time or have a larger diameter to provide a greater amount of heat. In one or more embodiments, fuel disc 901 is much larger in size and the apertures are sized and positioned to produce large, bright flames for several hours (similar to a manufactured firelog), which allows bowl assembly 102 to be used as a "fire pit". In one or more embodiments, wood may instead be burned in bowl assembly 102 to use it as a "fire pit".

Thus, a portable, lightweight, disposable kettle-type barbecue grill, a fuel disc for use with the grill, and methods for fabricating, packaging, assembling, and using such a grill and fuel disc, are described. Although the present invention has been described with respect to certain specific embodiments, it will be clear to those skilled in the art that the inventive features of the present invention are applicable to other embodiments as well, all of which are intended to fall within the scope of the present invention.

What is claimed is:

1. A set of components configured to be assembled into a barbecue grill comprising:
an ash catcher;
a support base comprising a top surface, a peripheral surface extending downward from the top surface to a bottom peripheral edge, a first plurality of integral stiffening ribs formed on the peripheral surface, a plurality of apertures formed on the peripheral surface, and an intake damper adjustment lever aperture, wherein the bottom peripheral edge is configured to be attached to the ash catcher;
a rotatable intake damper configured to be positioned adjacent to the top surface of said support base between the ash catcher and the support base, the rotatable intake damper comprising an intake damper adjustment lever configured to extend through the intake damper adjustment lever aperture;
a bottom bowl configured to be attached to the support base, the bottom bowl comprising a second plurality of integral stiffening ribs formed on a peripheral surface of said bottom bowl;
a charcoal tray configured to rest upon a first ridge in the bottom bowl;
a grill surface configured to rest upon a second ridge in the bottom bowl;
a lid comprising a top surface and a peripheral surface extending downward from the top surface to a bottom peripheral edge, said lid having an interior volume defined by the top and peripheral surfaces of said lid and a plane that comprises said bottom peripheral edge, said lid configured to rest upon an upper edge of the bottom bowl, wherein a third plurality of integral stiffening ribs are formed on the top and peripheral surfaces of said lid; and
a rotatable exhaust damper configured to be attached to a top of said lid;
wherein the ash catcher, support base, rotatable intake damper, bottom bowl, charcoal tray, and grill surface are configured to nest within the interior volume of said lid.

2. The apparatus of claim 1 wherein:
the first plurality of integral stiffening ribs are spaced at equal angles around the peripheral surface of the support base,
each of the plurality of apertures is positioned equidistant to and between two adjacent integral stiffening ribs on the peripheral surface of the support base,
the second plurality of integral stiffening ribs are spaced at equal angles around the peripheral surface of the bottom bowl, and
the third plurality of integral stiffening ribs comprises two or more groups of ribs, wherein a spacing between adjacent ribs within a group is finer than a spacing between adjacent groups.

3. The apparatus of claim 1 wherein at least one of the grill surface or the charcoal tray comprises a plurality of support members having an inverted V-shaped cross section.

4. The apparatus of claim 1 further comprising a thermometer configured to be attached to said lid.

5. The apparatus of claim 1 wherein the support base is configured to be attached to the ash catcher with at least one removable fastener.

6. The apparatus of claim 1 wherein the bottom bowl is configured to be attached to the support base with at least one removable fastener.

7. The apparatus of claim 1 wherein the rotatable exhaust damper is configured to be attached to said lid with at least one removable fastener.

8. The apparatus of claim 1 further comprising a first aperture in the support base, a second aperture in the rotatable intake damper, and a third aperture in the bottom bowl.

9. The apparatus of claim 8 wherein the ash catcher is configured to direct air flowing through the first aperture upward through the second and third apertures.

10. The apparatus of claim 1 wherein the first, second, and third plurality of integral stiffening ribs provide stiffness to the barbecue grill and allow said lid, support base, and bottom bowl to be made of a thin-walled material.

* * * * *